J. WILLIAMS.
MOTION PICTURE MACHINE.
APPLICATION FILED OCT. 27, 1919.

1,360,341.

Patented Nov. 30, 1920.
4 SHEETS—SHEET 1.

John Williams
INVENTOR
BY
ATTORNEY

J. WILLIAMS.
MOTION PICTURE MACHINE.
APPLICATION FILED OCT. 27, 1919.
1,360,341.
Patented Nov. 30, 1920.
4 SHEETS—SHEET 2.
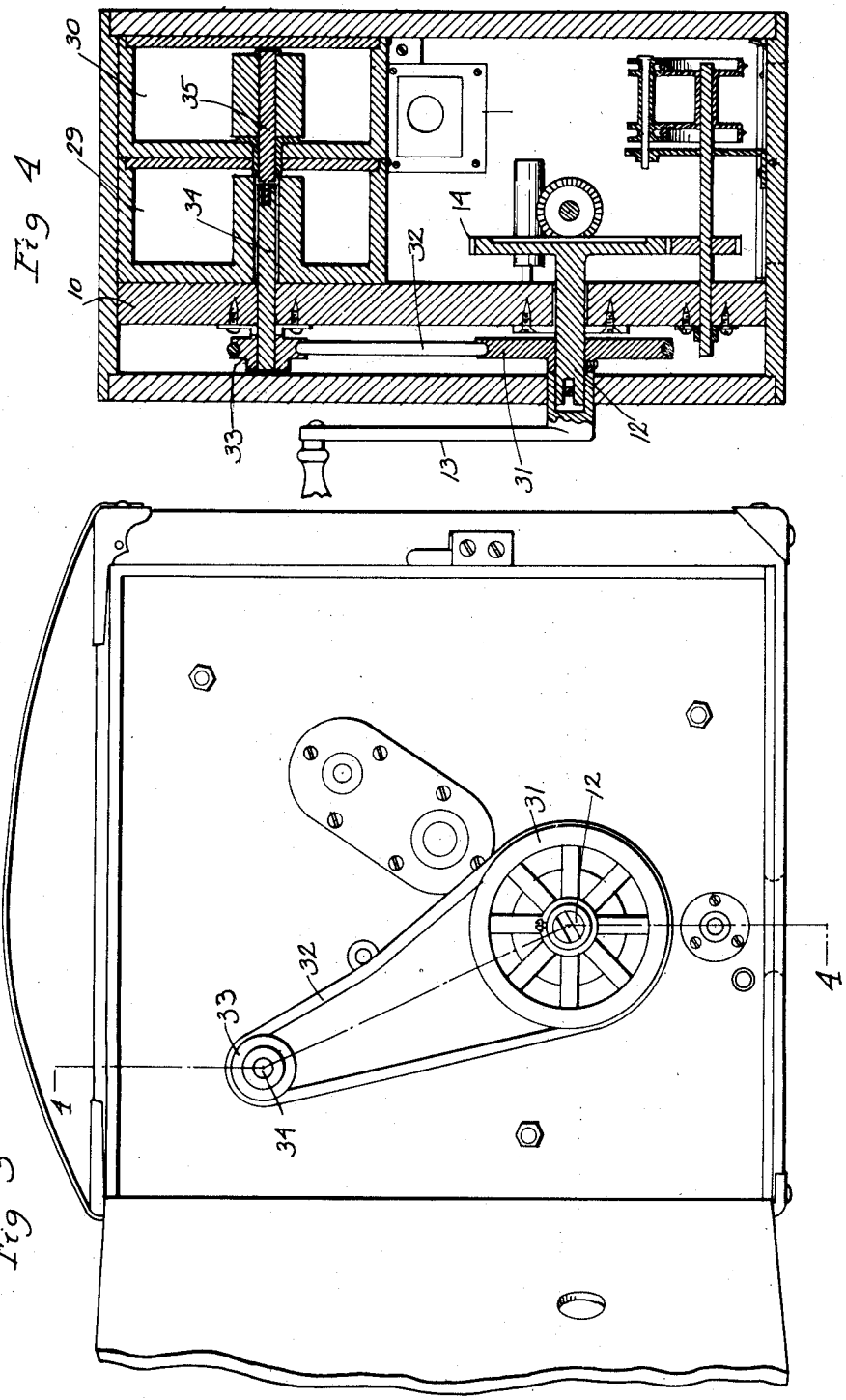

J. WILLIAMS.
MOTION PICTURE MACHINE.
APPLICATION FILED OCT. 27, 1919.

1,360,341.

Patented Nov. 30, 1920.

John Williams
INVENTOR
BY
ATTORNEY

UNITED STATES PATENT OFFICE.

JOHN WILLIAMS, OF NIAGARA FALLS, NEW YORK, ASSIGNOR TO THE PERFECT PROJECTOR MACHINE COMPANY, OF BUFFALO, NEW YORK, A COMMON LAW COMPANY OF NEW YORK.

MOTION-PICTURE MACHINE.

1,360,341.  Specification of Letters Patent.  Patented Nov. 30, 1920.

Application filed October 27, 1919. Serial No. 333,862.

*To all whom it may concern:*

Be it known that I, JOHN WILLIAMS, a citizen of the United States, residing at Niagara Falls, in the county of Niagara and State of New York, have invented new and useful Improvements in Motion-Picture Machines, of which the following is a specification.

This invention relates to motion picture machines, and more particularly it relates to improvements in machines which both take the pictures, and after development and printing project the same. In other words, my invention is a combination of a moving picture camera and a moving picture projector, which employs in the main the same mechanism, requiring only the slight changes hereinafter described.

The object of this invention, as above indicated, is to combine in a single apparatus efficient means for exposing a film for moving pictures and also for exposing and projecting the print of such film to throw the pictures upon the screen. A further object of my invention is to improve the mechanism for moving the film so as to attain the maximum of light period and the minimum of dark period; and a further object is so to improve the shutter mechanism as to give each exposure the maximum illumination. Still another object is to render the mechanism so simple and positive in action as to avoid all "chattering" and similar disagreeable effects when the film is improperly moved or controlled. Other and further objects of my invention will be evident from the following specification and from the annexed drawing, in which,—

Fig. 3 is a side elevation of the opposite side of the apparatus.

Fig. 4 is a vertical section on the line 4—4 of Fig. 3.

Figure 1:
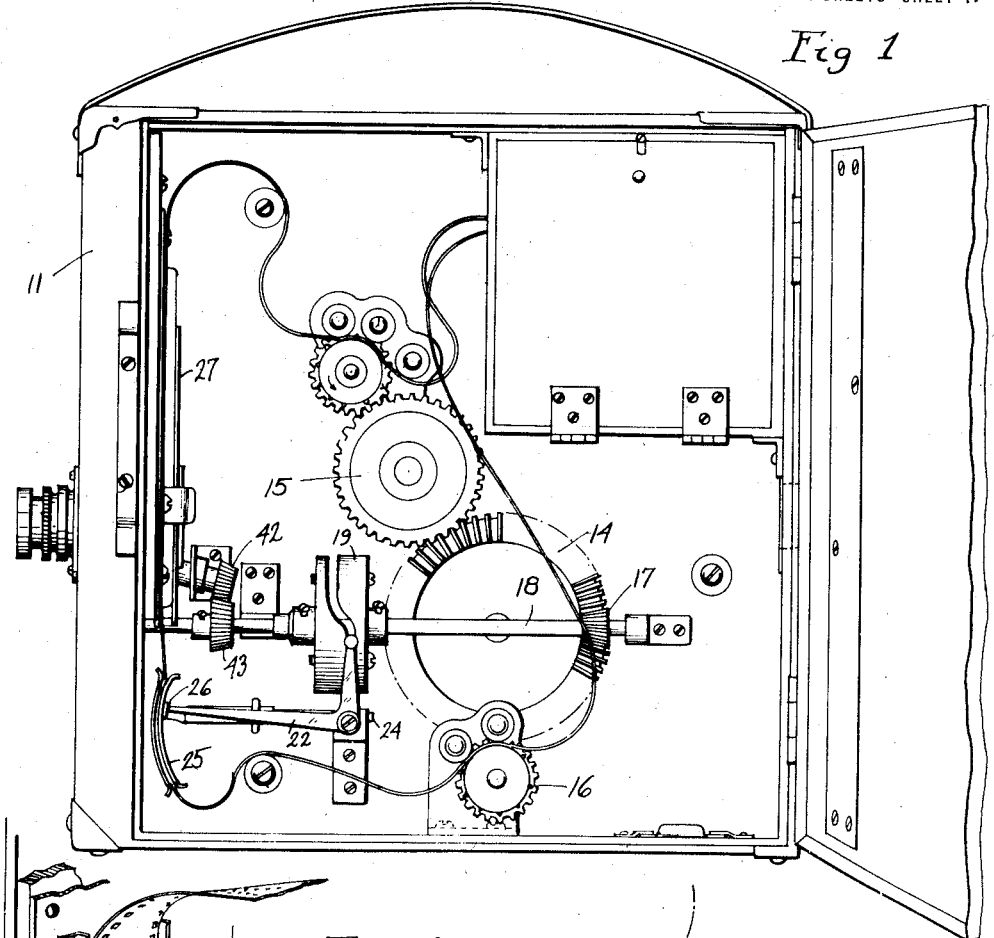
Figure 1 is an elevation of one side of the apparatus.
Figure 2:
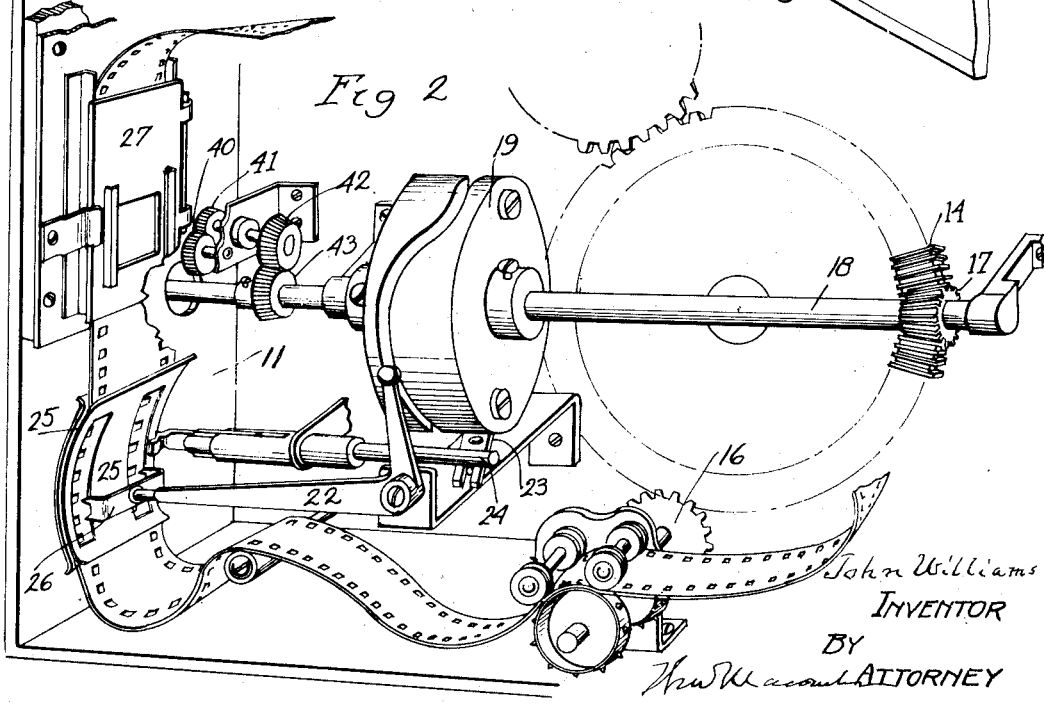
Fig. 2 is a detail perspective of the main part of the mechanism shown in Fig. 1.

I will first describe the mechanism for moving and holding the film both for exposure and for projection. As will be seen in Fig. 4 the apparatus is divided into two main compartments by a partition 10. This partition and the end 11, clearly shown in Figs. 1 and 2, support substantially all of the mechanism.

Figure 5:
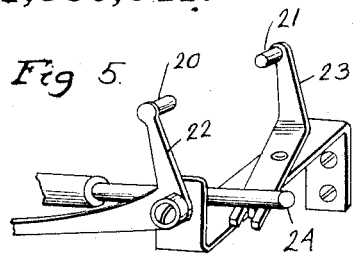
Fig. 5 is a perspective of my cam-followers and their lever connections.
Figure 6:
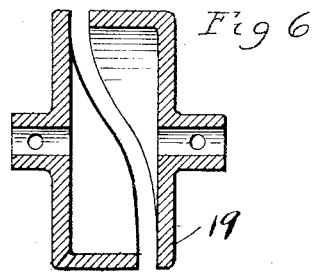
Fig. 6 is a cross-section of my cam.

Journaled in the partition 10 is a short shaft 12 to the outer end of which is removably attached the crank 13 for operating the apparatus. Upon the other end of this shaft is the gear 14 which is a combined bevel and spur gear. The spur gear portion meshes with the spur gears 15 and 16 which impart positive feed to the film in well-known manner and need not be further described. Meshing with the bevel gear portion of the gear 14 is a bevel gear 17 which is rigidly mounted upon a shaft 18. Upon the shaft 18 is a cam 19, which I preferably make in two parts and mount upon said shaft 18 in such manner that the two parts may be adjusted to take up any wear or slack so that the action of the cam-followers will be positive. Mounted within the slot of the cam 19 are the cam-followers 20 and 21, clearly shown in Fig. 5. These followers are rigidly secured to pivoted bell-crank levers 22 and 23. The lever 23 is movable horizontally and has a slot which engages a pin on a reciprocating rod 24 so mounted as to be held against turning movement. The rod 24 carries at its end remote from said lever a pair of spaced conforming plates 25 constituting a film guide and which participate in the reciprocation of said rod. The film passes between the plates 25, and these plates are slotted near their sides to permit the engagement of the film moving apparatus next described.

The free end of the bell-crank lever 22 is provided with the forked end 26 which has pointed projections adapted to engage in the holes or openings of a standard film.

The operation of this cam mechanism is as follows: At the proper instant the lever 23 moves the rod 24 inwardly so that the forked end of the lever 22 engages with the slots or openings in the film. The rod 24 then comes to rest, and holds the plates 25 rigidly, immediately upon which the forked ends 26, actuated by the cam-follower 20 move the film downwardly the exact distance to expose the next following picture on the film. Then both levers remain at rest for the exposure period; or at least for a portion of that period, when the plates 25 are moved outwardly by the lever 23 and immediately thereafter the lever 22 moves upwardly to its initial position.

Figure 7:
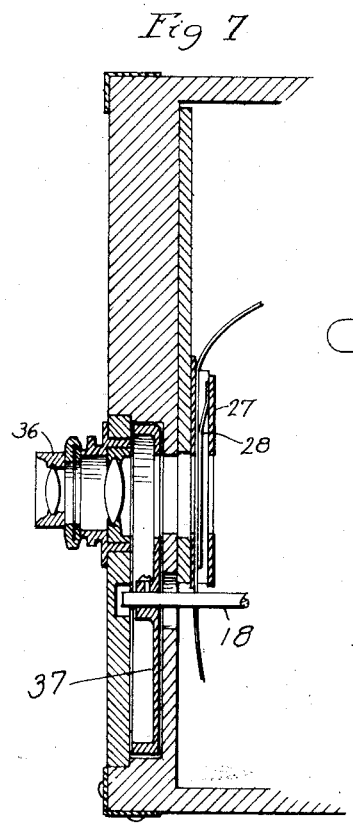
Fig. 7 is a detail section on the line 7—7 of Fig. 8.
Figure 8:
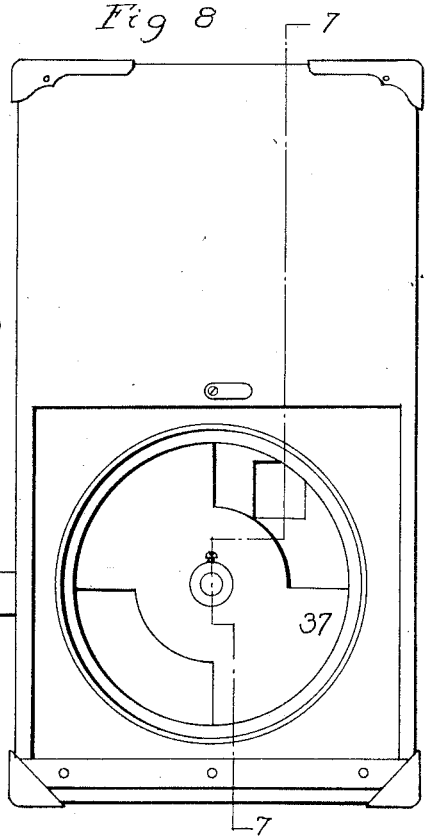
Fig. 8 is an end view of the apparatus with the shutter for exposing the film for taking the pictures.

The portion of the film over the exposure opening is held rigidly in place by the hinged plate 27 which has the spring clips 28 as shown in Fig. 7.

By this mechanism and by the employment of a single cam the film movement is rendered absolutely positive and exact in point of time to afford the most perfect exposure or projection.

The film to be exposed, whether for taking or projecting, is placed within the box 29, clearly shown in Fig. 4, and from a slot in that box is fed upward positively by the feed mechanism actuated by the gear 15. The film thus fed out and downwardly with the necessary amount of slack finally goes to the positive feed mechanism actuated by the gear 16 and thence to a reel in the box 30, as shown in Fig. 4, which is actuated positively in the following manner: Upon the shaft 12 is a pulley 31 which carries a belt 32 which engages over a pulley 33 on a shaft 34 (see Fig. 4), the inner end of this being slotted to engage the stem 35 of the reel within the box 30. In this manner the film is finally drawn into the box 30 and wound upon the reel as fast as it is fed through the machine.

I will next describe the means and method of exposing a film for taking the pictures and also for printing the positive film from the negative film when taken and developed. The apparatus and method will be understood from describing the method of making the original exposures, since the exposure for printing the positive film is substantially the same—the positive film being fed through with the negative film.

The taking lens 36 being put in place and the rotating exposure disk 37 being put in place upon the shaft 18 and having its slot openings positioned to time with the film moving mechanism, the crank is turned and the exposures are made while the film passes out of the box 29 and is wound up on the reel within the box 30. The film is then removed from the box 30 and developed in the usual manner, and is then ready to be placed in the box 29 with a positive film. The operation is then repeated, the lens 36 of course being removed and the positive film is then developed.

I will next describe my improved shutter which I use in projecting the pictures upon a screen. The rotating disk 38, shown in Figs. 10 and 11 has a spur gear 39 which meshes with spur gear 40 which in turn meshes with an offset gear 41 on a short shaft which carries a bevel gear 42 which meshes with a bevel gear 43 on the shaft 18. This gives the shutter 38 motion in rotation opposite to that of shaft 18. Secured to shaft 18 by a set screw and as close to the other disk as possible consistent with opposite rotation is the disk 44. When properly set with reference to each other these two shutter disks 38 and 44 so regulate or time the light and dark periods and also the focal exposure that the change from one picture to the next succeeding picture is so made as to present to the human eye a continuous, moving picture.

Figure 12:
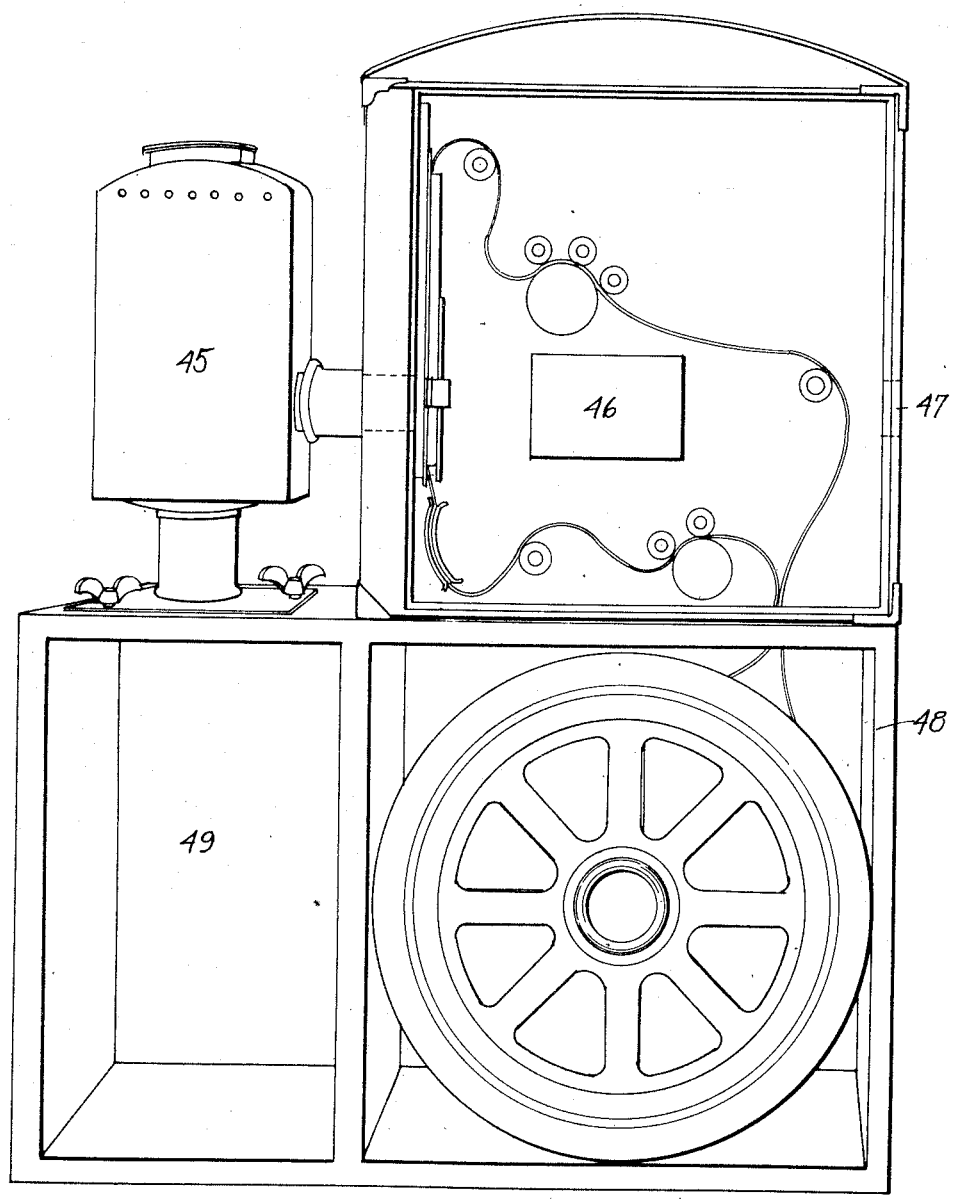
Fig. 12 is a side elevation, diagrammatic in character, showing the manner in which my invention may be employed in connection with a source of light and reels for holding the film.

It is to be understood that when the apparatus is used as a projector a source of light is placed substantially as shown in Fig. 12 at 45, and a projecting lens 46 is placed in the axis of said light and the rays emerge at the opening 47.

As above stated the film may be carried in the two boxes 29 and 30; but if it is desired, these boxes, which of necessity are limited in the length of film which they can carry, may be replaced by larger film boxes, placed side by side in a separate compartment as shown at 48 in Fig. 12; and this compartment may be extended to hold the lamp 45 and afford the space 49 into which the lamp may be placed when not in use, or otherwise utilized.

It will of course be understood that the various openings are made light tight by a well-known means. When the construction shown in Fig. 12 is employed the belt 32 as shown in Fig. 3 will pass over a pulley in one of the boxes in the compartment 48, thus affording a positive wind-up for the film as above described with reference to the boxes 29 and 30.

It will be understood also that the plates 25 are curved upon a radius of the same length as the longer arm of the bell-crank lever 22 so that the engagement of the forked ends 26 will be positive throughout the time that this lever is moving the film downward.

With an apparatus such as described and an ordinary quick developing film apparatus such as is in common use, a film may be exposed, developed, a positive made therefrom, and the pictures thrown upon a screen within a few moments from the time the pictures are taken.

Figure 9:
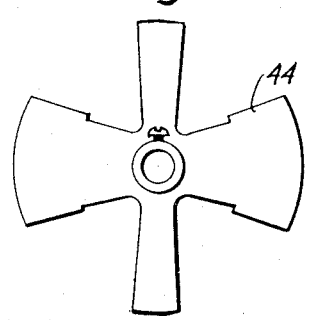
Fig. 9 is a view of one of my rotating shutters used in projecting the pictures and looked at from the outside.
Figure 10:
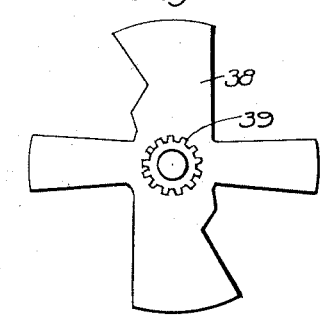
Fig. 10 is a similar view of the other shutter used in connection with that shown in Fig. 9, but looked at from the opposite side.
Figure 11:
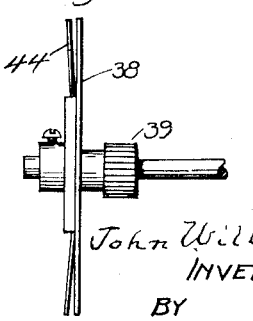
Fig. 11 is a detail elevation of the shutters shown in Figs. 9 and 10 in place for operation.

While I have shown in Figs. 9, 10 and 11 the preferable form of disks or rotating shutters, it is to be understood that my invention is inclusive of other forms of configurations which attain substantially the aforesaid ends.

Having thus described my invention and the method of its operation, I claim:

1. In a machine of the type described, and in combination with means for feeding a film, the combination of a cam, two cam-followers and pivoted levers actuated thereby, curved plates adapted to engage a film and having longitudinal slots to permit the engagement of film moving means therewith, one of said levers acting mediately to move said plates in and out of contact position, the other of said levers having forked ends adapted to engage in the marginal holes of a film, the curvature of said cam being such that the movement of the film is positive as described.

2. In an apparatus of the type described, a cam shaft, a gear for continuously rotating said shaft, a cam on said shaft, two followers engaging with said cam, levers actuated by said followers, a curved and slotted plate adapted to engage a film and a reciprocating rod connecting said plate with its respective lever for moving said plate, in and out of contact position, a forked end on the other of said levers adapted to engage in the marginal holes of the film and positively move the film to expose the next succeeding picture and a rotating shutter on the end of said cam shaft adapted to make the required exposure, film boxes, means for positively feeding the film and means for winding up the film.

3. The combination of a motion picture taking and projecting machine comprising a camera-shaped box, boxes therein for holding a film, a reciprocating, cam-actuated film guide, a cam connecting mechanism between said film guide and said cam, means for positively and intermittently moving the film comprising a reciprocating forked lever engageable with the film in a certain position of said film guide and during such engagement actuated by said cam, and a rotating shutter and timed to the movement of said levers.

4. The combination of a motion picture taking and projecting machine comprising a camera-shaped box, boxes therein for holding a film, a reciprocating, cam-actuated film guide, a cam connecting mechanism between said film guide and said cam, means for positively and intermittently moving the film comprising a reciprocating forked lever engageable with the film in a certain position of said film guide and during such engagement actuated by said cam, a rotating shutter adapted to being mounted upon the shaft of said cam for making the required exposures for taking and printing a film, and shutters for projecting pictures comprising two oppositely rotating segmental shutters, one of said shutters being mounted rigidly on the shaft of said cam and the other mounted loosely on said shaft and oppositely driven by offset gearing from said shaft, a source of light, a projecting lens and a lens adapted to be used with said first mentioned shutter for taking the pictures.

5. A motion picture camera comprising a camera box, receptacles therein for holding a film before and after exposure, a lens, a rotating shutter for making the exposure, a cam shaft for said shutter and a cam on said shaft, means for positively and intermittently moving said film and operated by said cam, in combination with means for converting said camera into a projector comprising a lamp which is placed in the position of said lens and oppositely rotating shutters on the shaft of said cam, one of which is positively driven with said shaft and the other of which is positively and oppositely driven by said shaft through offset gearing.

6. In a machine of the type described, the combination of a pair of levers, a film guide on one lever, means on the other lever to engage and move a film strip in a certain position of said guide, a continuously driven shaft, and cam means on said shaft for operating said levers.

7. In a machine of the type set forth, the combination of a lever having at its free end means for engaging and moving a strip of film, a guide for said strip, said guide being curved concentrically to the pivot of said lever and acting on the portion of said strip which is engaged by said means, and means for reciprocating said guide.

8. In a machine of the type set forth, the combination of a lever having at its free ends means for engaging and moving a strip of film, a guide for said strip, said guide and said lever being movable in angular paths and said guide being curved concentrically to the pivot of said lever and acting on the portion of said strip which is engaged by said means, and continuously operating means for reciprocating said lever and guide.

JOHN WILLIAMS.